(12) United States Patent
Soemers et al.

(10) Patent No.: US 11,649,860 B2
(45) Date of Patent: May 16, 2023

(54) DRIVE TRAIN ASSEMBLY FOR A PERSONAL CARE DEVICE

(71) Applicant: KONINKLIJKE PHILIPS N.V., Eindhoven (NL)

(72) Inventors: Herman Mathias Joannes Rene Soemers, Mierlo (NL); Johannes Balthasar Maria Soetens, Hilvarenbeek (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1071 days.

(21) Appl. No.: 16/332,266

(22) PCT Filed: Sep. 12, 2017

(86) PCT No.: PCT/EP2017/072898
§ 371 (c)(1),
(2) Date: Mar. 11, 2019

(87) PCT Pub. No.: WO2018/046760
PCT Pub. Date: Mar. 15, 2018

(65) Prior Publication Data
US 2019/0203775 A1 Jul. 4, 2019

Related U.S. Application Data

(60) Provisional application No. 62/393,321, filed on Sep. 12, 2016.

(51) Int. Cl.
*F16D 3/12* (2006.01)
*A61C 17/34* (2006.01)
(Continued)

(52) U.S. Cl.
CPC ............ *F16D 3/12* (2013.01); *A61C 17/3418* (2013.01); *F16F 1/16* (2013.01); *A61C 17/3481* (2013.01);
(Continued)

(58) Field of Classification Search
CPC .................. F16D 3/12; F16D 2121/24; F16D 2250/0076; F16F 1/16; F16F 2230/0005;
(Continued)

(56) References Cited

U.S. PATENT DOCUMENTS 6,833,639 B2 * 12/2004 Lau .................... A61C 17/3418
310/36
7,067,945 B2 * 6/2006 Grez .................... B26B 19/282
310/47
(Continued)

FOREIGN PATENT DOCUMENTS

CN 102111032 A 6/2011
EP 2246009 A1 11/2010
(Continued)

*Primary Examiner* — Robert A. Siconolfi
*Assistant Examiner* — James K Hsiao (57) ABSTRACT

A drive train assembly (200) for a personal care device (10), comprising a torsion spring (210) suspended between a first end mount (220) and a second end mount (230), the torsion spring comprising a first end mounted to the first end mount and a second end mounted to the second end mount, wherein the first and second ends of the torsion spring each comprises a cross flexure spring hinge (250, 260).

17 Claims, 6 Drawing Sheets

(51) Int. Cl.
*F16F 1/16* (2006.01)
*F16D 121/24* (2012.01)

(52) U.S. Cl.
CPC .. *F16D 2121/24* (2013.01); *F16D 2250/0076* (2013.01); *F16F 2226/048* (2013.01); *F16F 2230/0005* (2013.01); *F16F 2232/02* (2013.01); *F16F 2236/08* (2013.01); *F16F 2238/024* (2013.01)

(58) Field of Classification Search
CPC ............. F16F 2226/048; F16F 2232/02; F16F 2236/08; F16F 2238/024; A61C 17/3418; A61C 17/3481
See application file for complete search history.

(56) References Cited

U.S. PATENT DOCUMENTS

| | | | | |
|---|---|---|---|---|
| 8,525,373 | B2* | 9/2013 | Jungnickel | A61C 17/3472 310/36 |
| 8,863,344 | B2* | 10/2014 | Kloster | A61C 17/3481 15/22.1 |
| 9,084,659 | B2* | 7/2015 | Bovenkamp | A61C 17/3481 |
| 9,099,939 | B2* | 8/2015 | Jungnickel | B26B 19/282 |
| 10,952,833 | B2* | 3/2021 | Crossman | A61C 17/3418 |
| 11,291,294 | B1* | 4/2022 | Huang | A61C 17/3418 |
| 2003/0204924 | A1* | 11/2003 | Grez | A61C 17/3418 310/80 |
| 2006/0170293 | A1 | 8/2006 | Grez et al. | |
| 2008/0106156 | A1* | 5/2008 | Reishus | A46B 13/02 310/15 |
| 2008/0222822 | A1* | 9/2008 | Cobabe | A46B 15/0002 15/28 |
| 2010/0043157 | A1* | 2/2010 | Jungnickel | A46B 15/0008 15/22.1 |
| 2010/0072684 | A1* | 3/2010 | De Jong | F16F 1/16 267/154 |
| 2010/0132139 | A1* | 6/2010 | Jungnickel | A61C 17/3418 310/21 |
| 2010/0277013 | A1* | 11/2010 | Jungnickel | A61C 17/3418 310/37 |
| 2011/0119848 | A1* | 5/2011 | Kloster | A61C 17/3418 403/373 |
| 2012/0216358 | A1 | 8/2012 | Kloster | |
| 2012/0326370 | A1* | 12/2012 | Kloster | F16F 1/025 267/154 |
| 2013/0025080 | A1 | 1/2013 | Jungnickel | |
| 2013/0125320 | A1* | 5/2013 | Bovenkamp | F16H 23/00 74/61 |
| 2014/0060975 | A1 | 3/2014 | Kloster et al. | |
| 2014/0237744 | A1 | 8/2014 | Baertschi et al. | |
| 2014/0300039 | A1* | 10/2014 | De Jong | A61C 17/3481 267/154 |
| 2016/0324611 | A1* | 11/2016 | Bosman | A61C 17/225 |

FOREIGN PATENT DOCUMENTS

| | | |
|---|---|---|
| GB | 542131 | 12/1941 |
| JP | 1184305 A | 3/1999 |
| JP | 11084305 A | 3/1999 |
| WO | 2011134124 A1 | 11/2011 |

* cited by examiner

DRIVE TRAIN ASSEMBLY FOR A PERSONAL CARE DEVICE

CROSS-REFERENCE TO PRIOR APPLICATIONS

This application is the U.S. National Phase application under 35 U.S.C. § 371 of International Application No. PCT/EP2017/072898, filed on Sep. 12, 2017, which claims the benefit of U.S. Provisional Patent Application No. 62/393,321, filed on Sep. 12, 2016. These applications are hereby incorporated by reference herein.

FIELD OF THE INVENTION

The present disclosure is directed generally to a personal care device drive train arrangement having a V-shaped spring that does not require nodal mounting.

BACKGROUND

Proper tooth brushing, including length and coverage of brushing, helps ensure long-term dental health. Many dental problems are experienced by individuals who either do not regularly brush their teeth or who do so inadequately, especially in a particular area or region of the oral cavity. Among individuals who do brush regularly, improper brushing habits can result in poor coverage of brushing and thus surfaces that are not adequately cleaned during a cleaning session, even when a standard brushing regimen is followed. Electric cleaning devices, such as electric toothbrushes, have been shown to greatly increase the efficacy of a cleaning session.

These electric cleaning devices, including power toothbrushes, shavers, skin cleaners, and similar devices, have a motor, such as a mechanical or electromechanical motor, that engages a drive train in order to drive an attachment, such as a brush head, in an oscillating, reciprocating, or other pattern. One type of drive train arrangement uses a spring mounted at both ends. Some configurations have a node point located approximately mid-length between the two ends, and some springs have a V-shape.

These spring arrangements, however, are prone to failure as a result of, for example, fretting fatigue in which repeated forces at the interface of the clamped ends of the spring causes stresses on the spring and clamp. Over time, this can lead to failure of one or more of the parts. Furthermore, spring arrangements where the spring is mounted at both ends requires numerous different parts, which increases component costs, manufacturing costs, and production time.

Nodal mounting can also be unreliable or unpredictable, as the mounting can be overly stiff or it can result in hysteretic behavior of the drive, in which there is a significant lag between the force acting on the drive and the response of the drive. Hysteresis results in a highly inefficient drive and complicates any amplitude and force sensing performed by the system.

Accordingly, there is a continued need for personal care device drive trains arrangements having fewer parts and including a V-shaped spring that is not nodally mounted, resulting in increased robustness to stress and fatigue.

SUMMARY OF THE INVENTION

The present disclosure is directed to inventive drive train assemblies comprising a V-shaped spring suspended at both ends instead of nodally mounted. The V-shaped spring comprises an X-shaped spring hinge on both ends. Applied to an electric or power personal care device such as an electric toothbrush, skin cleaner, or shaver, the inventive systems provide a simplified drive train assembly that is more efficient and more resistant to stress.

Generally in one aspect, a drive train assembly for a personal care device is provided. The drive train assembly comprises a torsion spring suspended between a first end mount and a second end mount, the spring comprising a first end mounted to the first end mount and a second end mounted to the second end mount, wherein the first and second end of the torsion spring each comprises an X-shaped spring hinge.

According to an embodiment, the first end mount is configured to engage a motor.

According to an embodiment, the second end mount is configured to engage a mount for an attachment.

According to an embodiment, each of the X-shaped spring hinges comprises two spring leaflets extending outwardly from the torsion spring.

According to an embodiment, the torsion spring is V-shaped.

According to an embodiment, the drive train further includes a first support structure at the first end mount, the first end of the torsion spring being affixed to the first support structure, and a second support structure at the second end mount, the second end of the torsion spring being affixed to the second support structure. According to an embodiment, the first end of the torsion spring is welded to the first support structure, and wherein the second end of the torsion spring is welded to the second support structure.

According to another aspect is a drive train assembly for a personal care device. The drive train assembly comprises a first end mount configured to communicate with a motor; a second end mount configured to communicate with a mount for a brush head; a torsion spring suspended between the first end mount and the second end mount, the spring comprising a first end mounted to the first end mount and a second end mounted to the second end mount; a first support structure at the first end mount, the first end of the torsion spring affixed to the first support structure; and a second support structure at the second end mount, the second end of the torsion spring affixed to the second support structure; a first cross flexure on the first support structure; and a second cross flexure on the second support structure, wherein each of the cross flexures comprises two spring leaflets extending outwardly from the respective support structure.

According to another aspect is a personal care device. The personal care device includes: a housing; and a drive train assembly comprising a torsion spring suspended between a first end mount and a second end mount, the spring comprising a first end mounted to the first end mount and a second end mounted to the second end mount, wherein the first and second ends of the torsion spring each comprises an X-shaped spring hinge.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a drive train assembly for an electric personal care device. More generally, Applicant has recognized and appreciated that it would be beneficial to provide a spring assembly that is non-nodally mounted, which would be more efficient and more resistant to stress. Accordingly, the systems described or otherwise envisioned herein provide a personal care device, such as an electric toothbrush or shaver, with a drive train spring assembly comprising a non-nodally mounted V- or U-shaped spring assembly where the spring comprises an X-shaped spring hinge at both ends.

A particular goal of utilization of the embodiments and implementations herein is to provide a drive train spring assembly for an personal care device such as, e.g., a Philips Sonicare™ toothbrush (manufactured by Koninklijke Philips Electronics, N.V.), although the assembly may be utilized with many other personal care devices, including but not limited to shavers, skin cleaners and other personal care devices having reciprocal movements.

Figure 1:
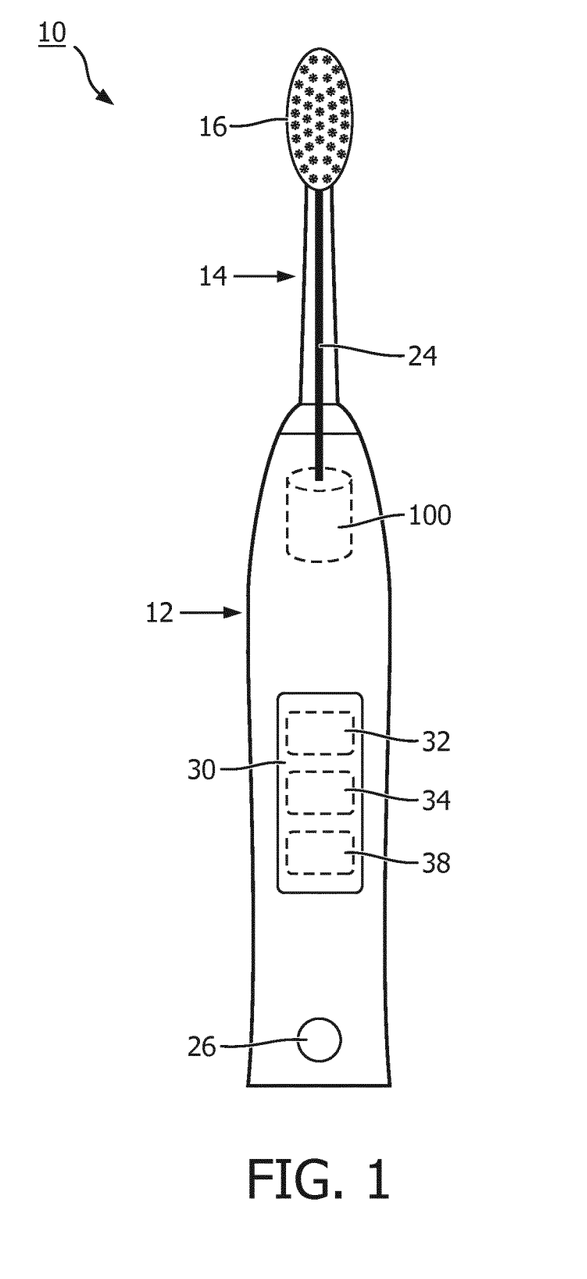
FIG. 1 is a schematic representation of a personal care device, in accordance with an embodiment.

Referring to FIG. 1, in one embodiment, an personal care device 10 is provided that includes a body portion 12 and an attachment, such as a brush head member 14, as shown here. Attachment 14 includes at its end remote from the body portion a brush head 16.

Attachment 14 is mounted so as to be able to move relative to the body portion 12. The movement can be any of a variety of different movements, including vibrations or rotation, among others.

The body portion 12 typically contains a drive train assembly 100, 200 for generating movement and a transmission component or drivetrain shaft, 24 for transmitting the generated movements to attachment 14. For example, drive train 100, 200 comprises a motor or electromagnet(s) that generates movement of a spring assembly, which is subsequently transmitted to the brush head member 14. Drive train 100, 200 can include components such as a power supply, an oscillator, and one or more electromagnets, among other components. In this embodiment the power supply comprises one or more rechargeable batteries, not shown, which can, for example, be electrically charged in a charging holder in which personal care device 10 is placed when not in use. According to one embodiment, attachment 14 is mounted to the drive train shaft 24 so as to be able to vibrate relative to body portion 12. The attachment 14 can be fixedly mounted onto drive train shaft 24, or it may alternatively be detachably mounted so that attachment 14 can be replaced with a different attachment for different operating features, or when the bristles or another component of the attachment are worn out and require replacement.

The body portion 12 is further provided with a user input 26 to activate and de-activate drive train 100, 200. The user input 26 allows a user to operate the personal care device 10, for example to turn it on and off. The user input 26 may, for example, be a button, touch screen, or switch.

The body portion of the device also comprises a controller 30. Controller 30 may be formed of one or multiple modules, and is configured to operate the personal care device 10 in response to an input, such as input obtained via user input 26. Controller 30 can comprise, for example, a processor 32 and a memory 34, and can optionally include a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of personal care device 10. According to an embodiment, connectivity module 38 transmits collected sensor data, and can be any module, device, or means capable of transmitting a wired or wireless signal, including but not limited to a Wi-Fi, Bluetooth, near field communication, and/or cellular module.

Figure 2:
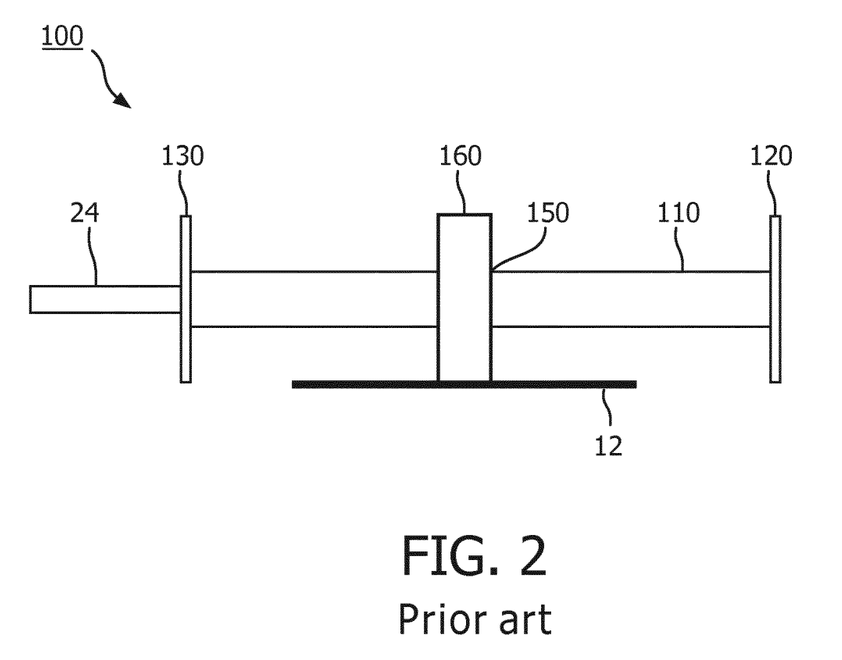
FIG. 2 is a schematic representation of a prior art drive train assembly of n personal care device.

Referring to FIG. 2 is a prior art drive train assembly 100 with a nodally-mounted V-shaped torsion spring 110. The prior art drive train assembly 100 comprises a first end mount 120, which is driven by a motor (not shown). The drive train assembly also includes a second end mount 130. Extending from second end mount 130 is a drive shaft for connection of an attachment 14 (not shown). The nodally-mounted V-shaped torsion spring 110 is fixedly mounted at the respective ends thereof to end mount assemblies 120 and 130. At approximately the center point, which is node point 150, the torsion spring 110 is mounted via element 160 to the body 12. Element 160 may be, for example, a spring, fixed ring, or other linking component.

Figure 3:
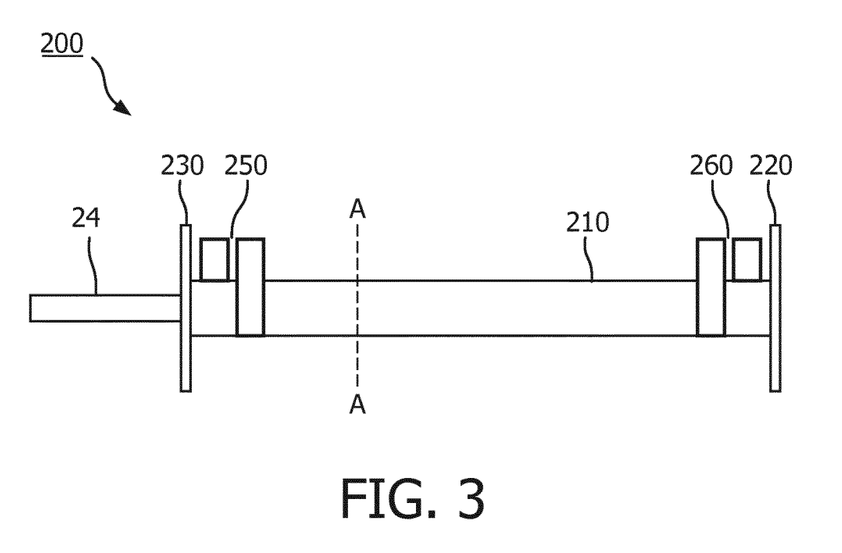
FIG. 3 is a schematic representation of a drive train assembly of a personal care device, in accordance with an embodiment.

Referring to FIG. 3, in one embodiment, is a drive train assembly 200 of the present invention, with a non-nodally mounted torsion spring 210. The drive train assembly 200 comprises a first end mount 220, which is driven by a motor (not shown). The drive train assembly also includes a second end mount 230. Extending from second end mount 230 is a drive shaft 240 for connection of an attachment 14 (not shown). The spring 210 is mounted at the respective ends thereof to end mount assemblies 220 and 230. Unlike the prior art spring 110, spring 210 is not nodally mounted along its central length. Instead, the spring 210 comprises a X-shaped cross flexure spring hinge 250 and 260 on each end. Each of the cross flexures 250, 260 comprises two spring hinge leaflets attached at a respective end of the spring 210 to form an X-shape. This eliminates the need for a number of supporting components, as needed in the prior art.

Figure 4:
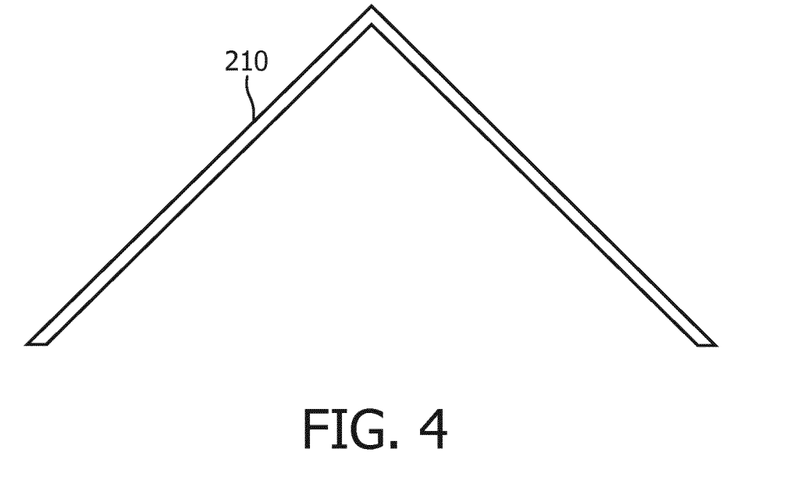
FIG. 4 is a schematic representation of a cross-section of a V-shaped spring for a drive train assembly of a personal care device, in accordance with an embodiment.
Figure 5:
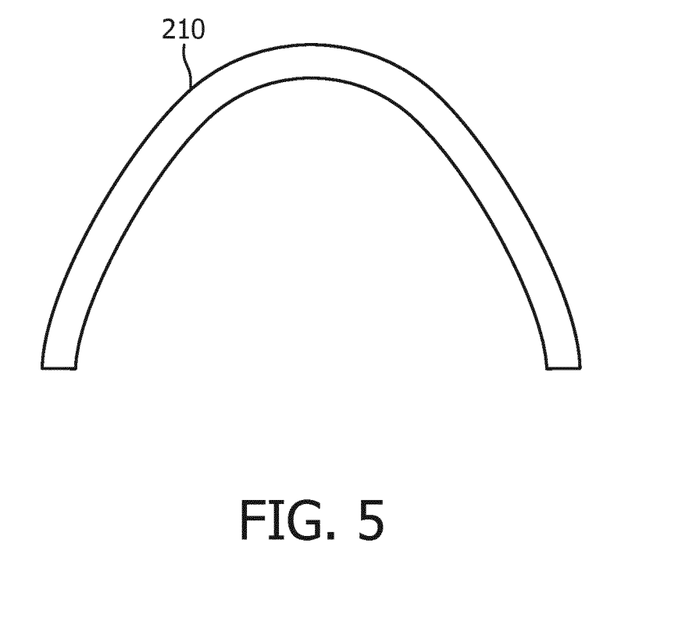
FIG. 5 is a schematic representation of a cross-section of a U-shaped spring for a drive train assembly of a personal care device, in accordance with an embodiment.

Referring to FIG. 4, in one embodiment, is a cross-section of a V-shaped torsion spring 210 taken at axis A-A of FIG. 3. Similarly, referring to FIG. 5 is a cross-section of a U-shaped spring 210 taken at axis A-A of FIG. 3. Spring 210 can comprise many different shapes and sizes. Additionally, the spring can be composed of one or more materials providing sufficient resiliency, resistance to stress, and other desirable characteristics.

Figure 6:
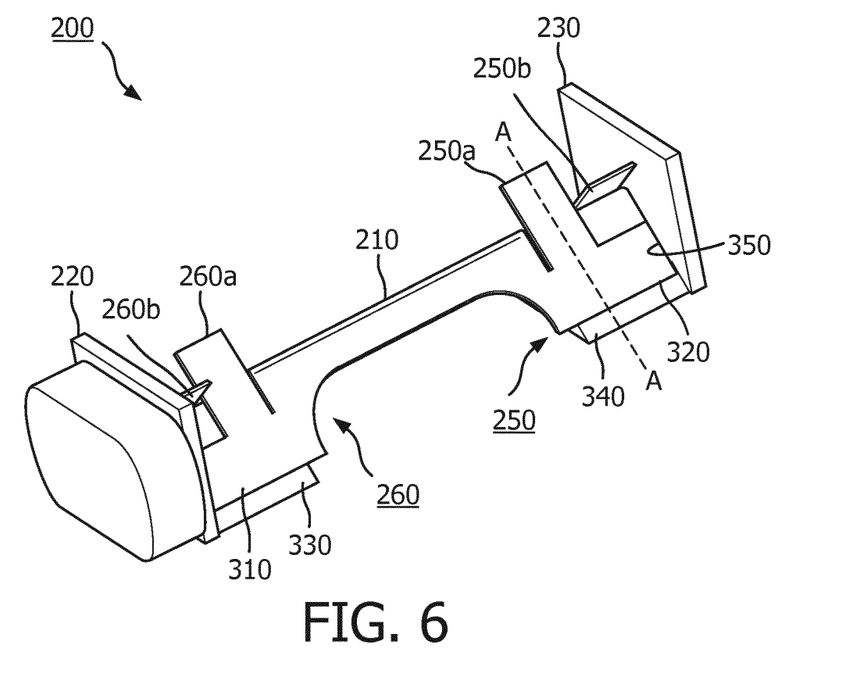
FIG. 6 is a schematic representation of a drive train assembly of a personal care device, in accordance with an embodiment.

Referring to FIG. 6, in one embodiment, is a drive train assembly 200 with a non-nodally mounted torsion spring 210. The drive train assembly 200 comprises a first end mount 220, which is driven by a motor (not shown). The drive train assembly also includes a second end mount 230. The spring 210 is mounted at the respective ends thereof to end mount assemblies 220 and 230. The spring 210 comprises an X-shaped cross-flexure spring hinge 250 and 260 on each end. Each of the cross flexure spring hinges 250, 260 comprises two spring hinge leaflets 250a, 250b; 260a, 260b attached at one end to the spring 210 that form an X-shape.

According to an embodiment, the two ends of the spring 210 can be fixed in place using any one of a variety of mechanisms. For example, the two ends can be fixed in place with screws, bolts, or another fixing method. As yet another example, the two ends of the spring can be fixed in place by welding the ends, such as by laser welding. For example, referring to FIG. 6, the first end of the spring 210 can be welded or otherwise fixed to a support structure 330 at or along region 310. Similarly, the second end of the spring 210 can be welded or otherwise fixed to a similar support structure 340 at or along region 320. In addition to welding or connecting the ends of the spring to the respective support structures 330 and 340, the ends of the spring can be welded or otherwise fixed to the first and second end mount assemblies 220 and 230. For example, as shown in FIG. 6, the second end can be welded or fixed to second end mount assembly 230 at intersection point 350.

Figure 7:
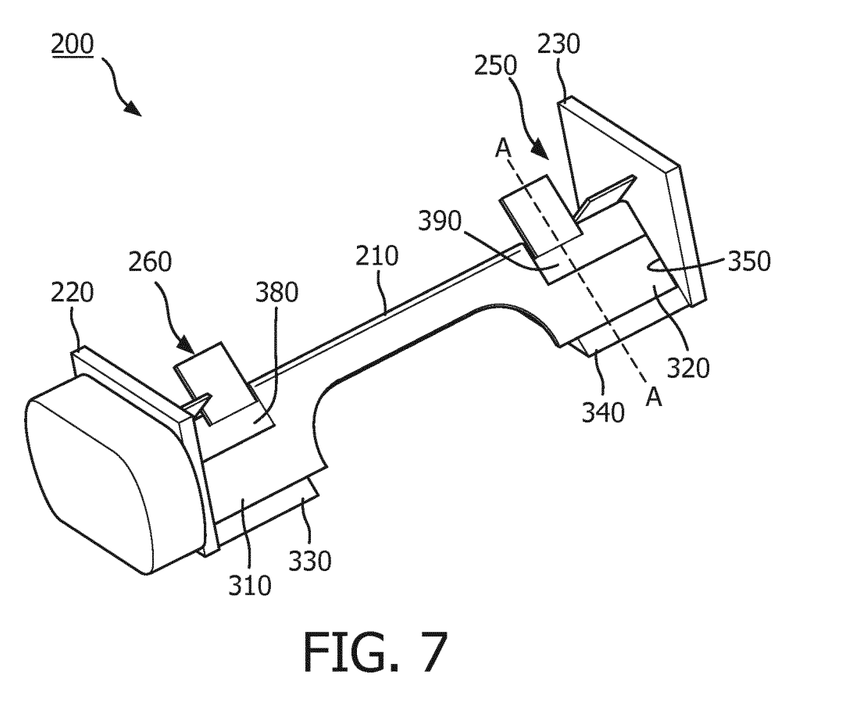
FIG. 7 is a schematic representation of a drive train assembly of a personal care device, in accordance with an embodiment.

Referring to FIG. 7, according to another embodiment, is a drive train assembly 200 with a non-nodally mounted torsion spring 210. The drive train assembly 200 comprises a first end mount 220, which is driven by a motor (not shown). The drive train assembly also includes a second end mount 230. Extending from second end mount 230 is a drive shaft 24 (not shown) for an attachment. The spring 210 is mounted at the respective ends thereof to end mount assemblies 220 and 230. According to this embodiment, the drive train assembly comprises a cross flexure spring hinge 250 and 260 on each of the first support structure 330 and the second support structure 340. Each of the cross flexures 250, 260 comprises two spring hinge leaflets 250a, 250b; 260a, 260b (shown in FIG. 6) attached at one end to the spring 210 that form an X-shape. Each of the leaflets is attached to the respective support structure, and the attached end of each leaflet is spaced slightly from the spring 210 by a space 380, 390. This enables larger X-spring deflections, among other benefits.

Figure 8:
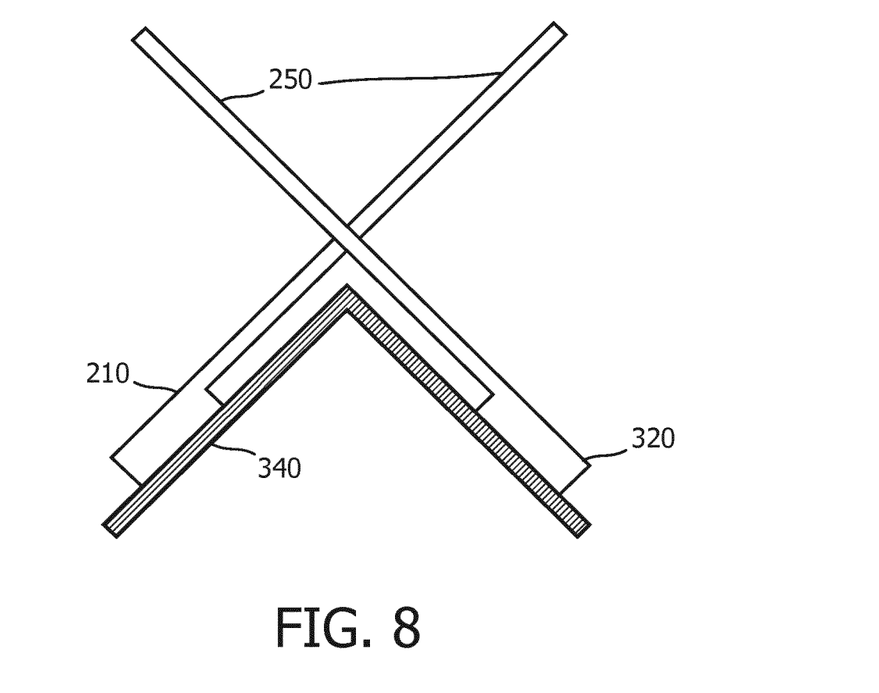
FIG. 8 is a cross-section of a portion of a drive train assembly of a personal care device, in accordance with an embodiment.
Figure 9:
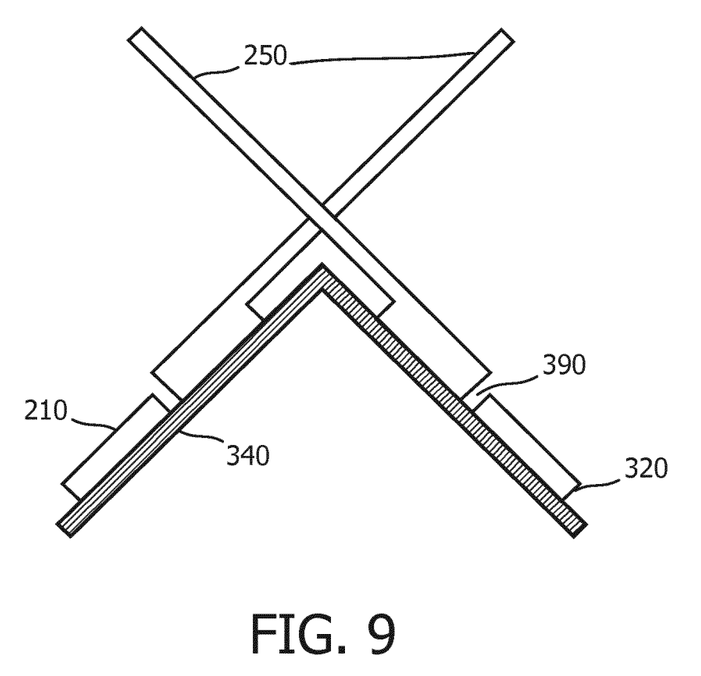
FIG. 9 is a cross-section of a portion of a drive train assembly of a personal care device, in accordance with an embodiment.

FIGS. 8 and 9 are cross-sections of various embodiments of the drive train assembly 200, taken along axis A-A in FIGS. 6, 7, or a similar embodiment of the assembly 200. In FIG. 8, for example, the two spring hinge leaflets of the cross flexure spring hinge 250 are connected to and extend outwardly from the spring 210. In this embodiment the two spring leaflets of the cross flexure 250 are not directly connected to the second support structure 340, but are connected via spring 210, which is connected to the second support structure 340. According to another embodiment, the two spring leaflets of the cross flexure spring hinge 250 may be directly connected to both the spring 210 and the second support structure 340. In FIG. 9, for example, the two spring hinge leaflets of the cross flexure spring hinge 250 are not directly connected to the spring 210, but are instead connected to the second support structure 340. A space 390 is located between the spring 210 and the cross flexure spring hinge 250. Although these two embodiments are depicted in FIGS. 8 and 9, it should be appreciated that many other embodiments are possible.

Figure 10:
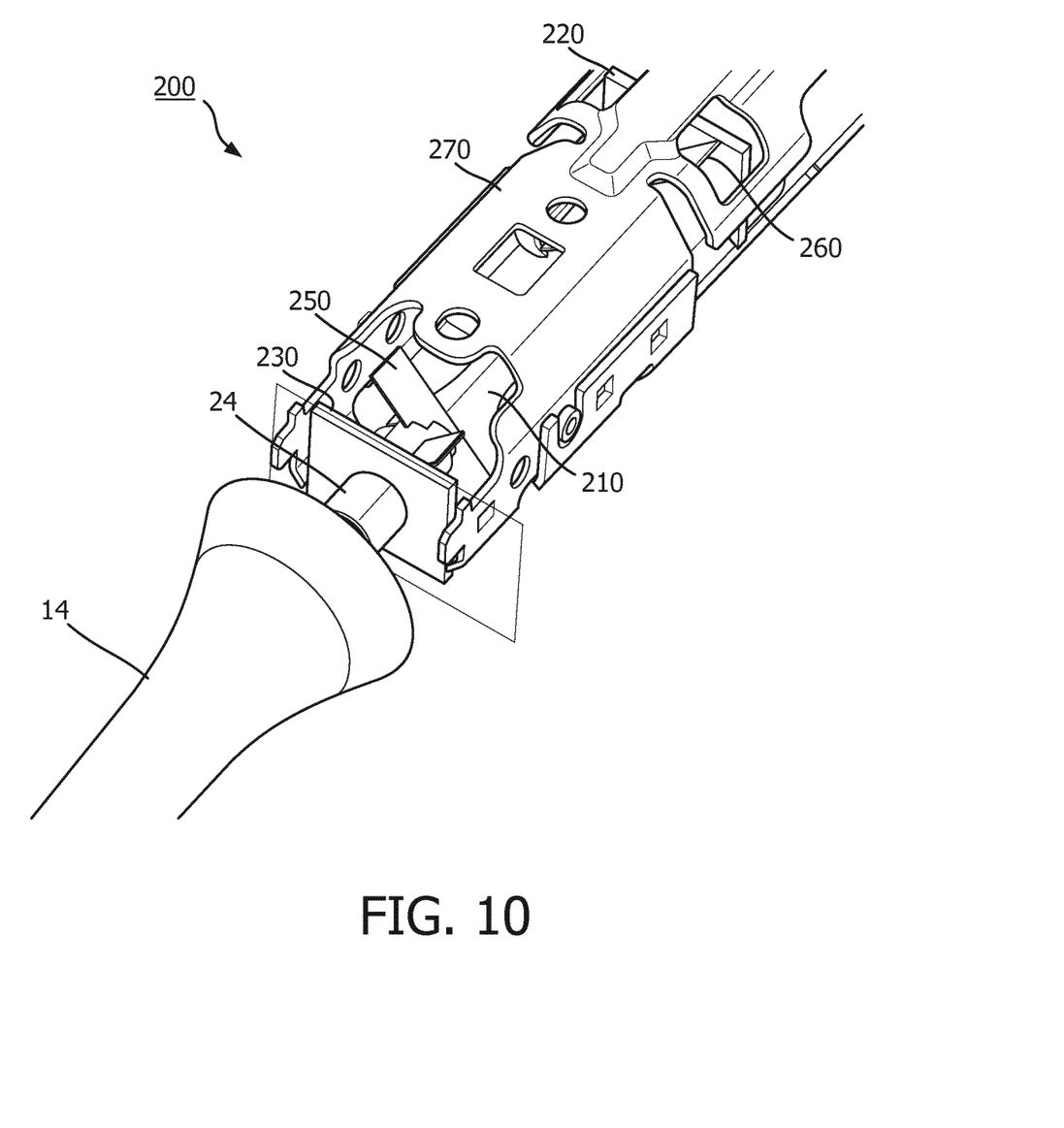
FIG. 10 is a schematic representation of a drive train assembly of a personal care device, in accordance with an embodiment.

Referring to FIG. 10, in one embodiment, is a drive train assembly 200 with a non-nodally mounted torsion spring 210. The drive train assembly 200 comprises a first end mount 220, which is driven by a motor (not shown). The drive train assembly also includes a second end mount 230. Extending from second end mount 230 is drive shaft 24 for connecting an attachment 14. The spring 210 is mounted at the respective ends thereof to end mount assemblies 220 and 230. The spring 210 comprises an X-shaped cross flexure spring hinge 250 and 260 on each end. Each of the cross flexure spring hinges 250, 260 comprises two spring hinge leaflets 250a, 250b; 260a, 260b attached at one end of the spring 210 that form an X-shape. Surrounding the drive train assembly is an internal drive housing 270.

The alternative non-nodally mounted spring suspension system of the present invention is an improvement over the prior art system shown in FIG. 2 that reduces complexity of attachment, and provides more predictable behavior of the system. The system still enables 2-mode operation of the drive system, without the need for clamping of a nodal point for the second mode of operation. The drive system of the present invention reduces vibration and lack drive hysteresis, enabling easier amplitude and force sensing of the drive system. Because of the reduced complexity of the attachment, material stresses that can lead to premature breakage and drive hysteresis are drastically reduced. Additionally, reduced attachment complexity reduces the number of parts needed and manufacturing complexities and costs.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A drive train assembly for a personal care device, comprising:
   a torsion spring suspended between a first end mount and a second end mount, the torsion spring comprising a first end mounted to the first end mount and a second end mounted to the second end mount, wherein the first and second ends of the torsion spring each comprises a cross flexure spring hinge, wherein each of the cross flexure spring hinges comprise two spring hinge leaflets extending outwardly from the first and second ends of the torsion spring, wherein the two spring hinge leaflets cross one another while extending in opposite directions.

2. The drive train assembly of claim 1, wherein the first end mount is configured to engage a motor.

3. The drive train assembly of claim 1, wherein the second end mount is configured to engage a drive shaft for connection of an attachment.

4. The drive train assembly of claim 1, wherein each of the spring hinge leaflets are directly connected to both the torsion spring and a second support structure.

5. The drive train assembly of claim 1, wherein the torsion spring is V-shaped along its length.

6. The drive train assembly of claim 1, further comprising:
   a first support structure at the first end mount, wherein the first end of the torsion spring is affixed to the first support structure; and
   a second support structure at the second end mount, wherein the second end of the torsion spring is affixed to the second support structure.

7. The drive train assembly of claim 6, wherein the first end of the torsion spring is welded to the first support structure, and wherein the second end of the torsion spring is welded to the second support structure.

8. A drive train assembly for a personal care device, comprising:
   a first end mount, the first end mount configured to communicate with a motor;
   a second end mount, the second end mount configured to communicate with a drive shaft for connection of an attachment;
   a torsion spring suspended between the first end mount and the second end mount, the spring comprising a first end mounted to the first end mount and a second end mounted to the second end mount;
   a first support structure at the first end mount, wherein the first end of the torsion spring is affixed to the first support structure;
   a second support structure at the second end mount, wherein the second end of the torsion spring is affixed to the second support structure;
   a first cross flexure spring hinge on the first end of the torsion spring; and
   a second cross flexure spring hinge on the second end of the torsion spring, wherein each of the cross flexure spring hinges comprise two spring hinge leaflets extending outwardly from the first and second ends of the torsion spring, wherein the two spring hinge leaflets cross one another while extending in opposite directions.

9. The drive train assembly of claim 8, wherein the torsion spring is V-shaped.

10. The drive train assembly of claim 8, wherein the first end of the torsion spring is welded to the first support structure, and wherein the second end of the torsion spring is welded to the second support structure.

11. A personal care device comprising:
a housing; and
a drive train assembly comprising a torsion spring suspended between a first end mount and a second end mount, the torsion spring comprising a first end mounted to the first end mount and a second end mounted to the second end mount, wherein the first and second ends of the torsion spring each comprises a cross flexure spring hinge, wherein each of the cross flexure spring hinges comprise two spring hinge leaflets extending outwardly from the first and second ends of the torsion spring, wherein the two spring hinge leaflets cross one another while extending in opposite directions.

12. The personal care device of claim 11, wherein the first end mount is configured to engage a motor.

13. The personal care device of claim 11, wherein the second end mount is configured to engage a drive shaft for connection of an attachment.

14. The personal care device of claim 11, wherein each of the spring hinge leaflets are directly connected to both the torsion spring and a second support structure.

15. The personal care device of claim 11, further comprising:
a first support structure at the first end mount, wherein the first end of the torsion spring is affixed to the first support structure; and
a second support structure at the second end mount, wherein the second end of the torsion spring is affixed to the second support structure.

16. The personal care device of claim 15, wherein the first end of the torsion spring is welded to the first support structure, and wherein the second end of the torsion spring is welded to the second support structure.

17. The personal care device of claim 11, wherein the torsion spring is V-shaped.

* * * * *